INVENTOR.
PHILLIP M. KNAPP

Dec. 8, 1964 P. M. KNAPP 3,160,415
STRAFING TARGET USING SCHLIEREN EFFECT
Filed Nov. 20, 1961 3 Sheets-Sheet 3

INVENTOR.
PHILLIP M. KNAPP
BY
Lawrence S. Epstein
ATTORNEY

United States Patent Office 3,160,415
Patented Dec. 8, 1964

3,160,415
STRAFING TARGET USING SCHLIEREN EFFECT
Phillip M. Knapp, Timonium, Md., assignor, by mesne assignments, to the United States of America as represented by the Secretary of the Navy
Filed Nov. 20, 1961, Ser. No. 154,115
5 Claims. (Cl. 273—102.2)

The present invention. relates to an arrangement for indicating shooting results during gunnery practice and is particularly directed towards a hit determining system for a strafing target. Heretofore, devices utilized for this purpose comprise audio or shock wave detection devices which are sensitive to sound or shock waves in the immediate vicinity of the detector. These present devices are subject to errors due to sound or shock wave reflections from the sides of the target or other surrounding obstacles. The instant device utilizes optical detection means. Previous devices utilized microphone techniques. The advantages of the instant device over the microphone techniques is that debris entering the tunnel caused by near hits result in acoustical fronts which would actuate a microphone. However, the Schlieren detector is energized by shock waves and would not see an acoustical front caused by near hits.

Accordingly, an object of the instant invention is the provision of a novel hit detection system for recording gun fire hits.

A further object of the instant invention is to provide a novel hit detection system utilizing optical detectors.

Another object of the instant invention is to provide a hit detection system which is insensitive to near hits and is very accurate to actual hits.

Other objects and many of the attendant advantages of this invention will be readily appreciated as the same becomes better understood by reference to the following detailed description when considered in connection with the accompanying drawings wherein.

In order to aid in better understanding of the operation of the Schlieren effect detector an earlier type of projectile detector using X and Y coordinate lights and shown in FIG. 4 will be explained.

Figure 4:
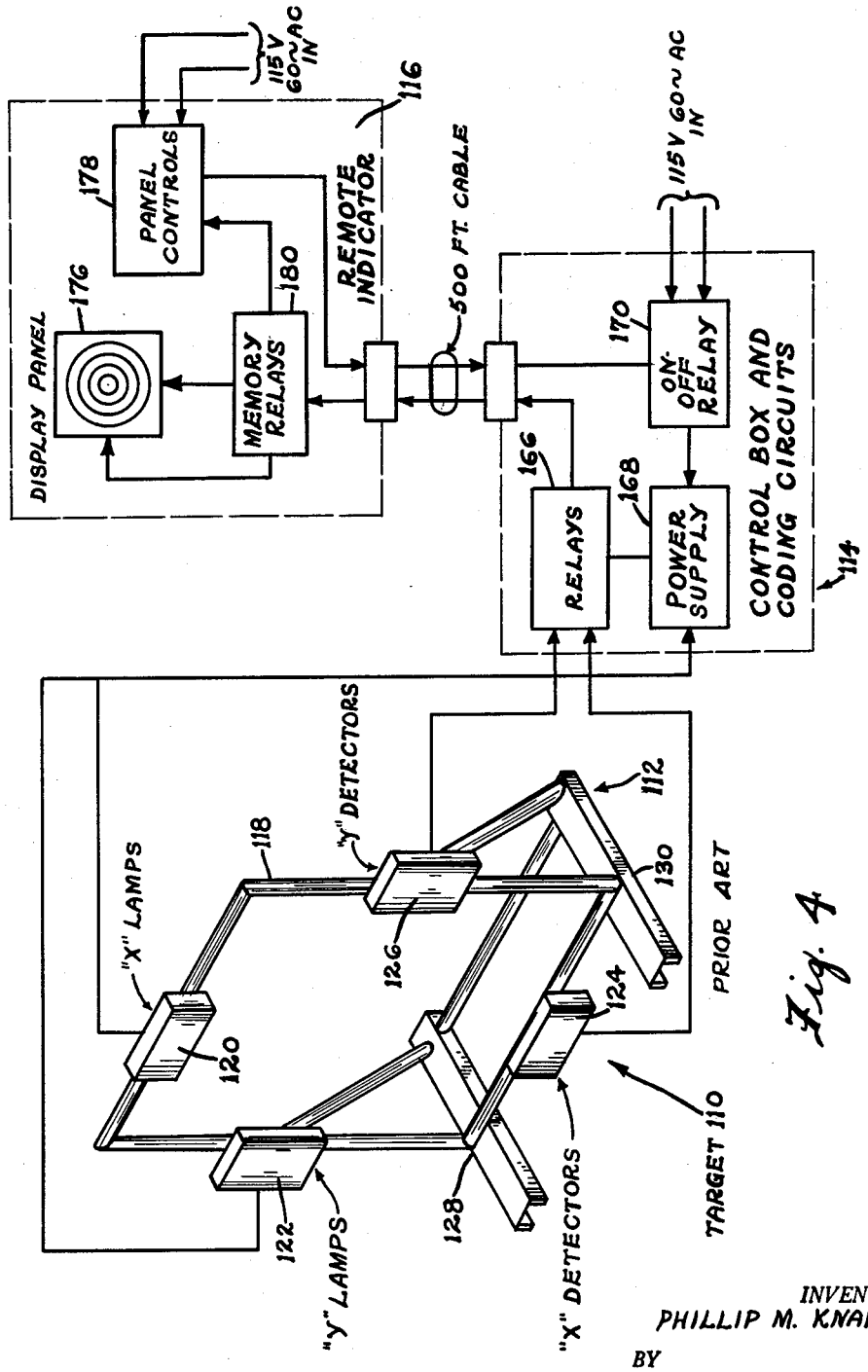
FIG. 4 is a block diagram of a previously used hit detection system.

Referring to FIG. 4, the target 110 consists of three basic units: the target frame 112; the coupling circuits and control box 114; and the remote indicator 116. The target consists of a rigid frame 118 which serves as a mounting fixture for the light beam collimating equipment 120 and 122 and the collecting lenses and detecting circuits 124 and 126. The frame shown in the preferred embodiment is made of welded tubular steel and is intended to be mounted on a concrete pad. Corner gussets 128 provide lateral stability to the fixture and have welded to them thread studs for clamping the wooden frame 130 to the fixture to which a paper target is stapled. The top and left side of this frame have pads on which are mounted the light beam collimating equipment 120 and 122. These consist of two boxes, 120 and 122, one on each axis, in which are mounted ten collimating lenses and ten tungsten lamps. The box is divided into compartments, one for each beam with lamps in their adjustable holder so that the beam's direction may be accurately adjusted. A removable cover is provided so that these lamps may be adjusted without removing the box from the frame.

Opposite these light beam collimating assemblies are the detector assemblies. These consist of similar compartmented boxes provided with ten collecting lenses which focus the collimated beam onto phototransistors. The outputs of these transistors are grouped in pairs which results in a target of ten one-inch light beams producing an effective target of five two-inch light beams. Each light beam pair has its own two-stage transistor amplifier which triggers an electronic switch (bistable multivibrator). The hit detection circuit comprises a phototransistor, a two-stage transistor amplifier, a bistable multivibrator and a transistor-controlled relay. The change of light intensity is detected by the phototransistor, amplified by the amplifiers and applied to the multivibrator. This multivibrator in usual multivibrator fashion produces a pulse which is applied through a transistor to actuate a relay. This output signal from the relay is applied to the remote hit detector unit. There are five hit detection circuits in the X axis of the target. The Y axis also has five photocell hit detection circuits. Each photoelectric cell assembly and detection circuit has an amplifier associated with it and a separate relay. Remote indicator 116 shown on FIG. 4 comprises a display panel 176, panel controls 178 and memory relays 180. Thus, in operation, when a signal is detected by the X1 detector, a pulse is generated which is applied to the remote indicator to actuate a relay. If at the same time a pulse is detected by the Y1 detector, an actuating pulse will be applied to actuate another relay. A lamp in the remote target will light when both X and Y relays apply voltage to it. The embodiment shown in FIG. 4 scores only at the center area of the target since this is the only area which is provided X and Y hit sensing equipment.

Figure 1:
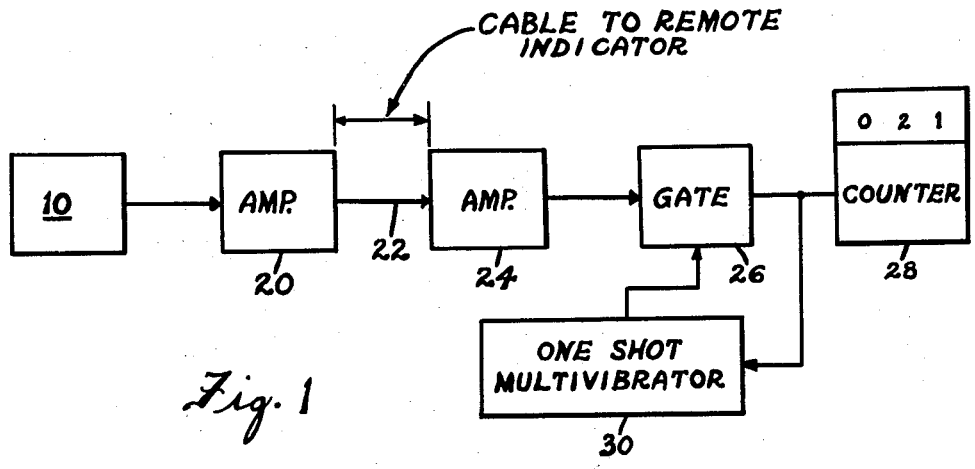
FIG. 1 is a block diagram of electronic circuitry of the Schlieren effect detector.
Figure 2:
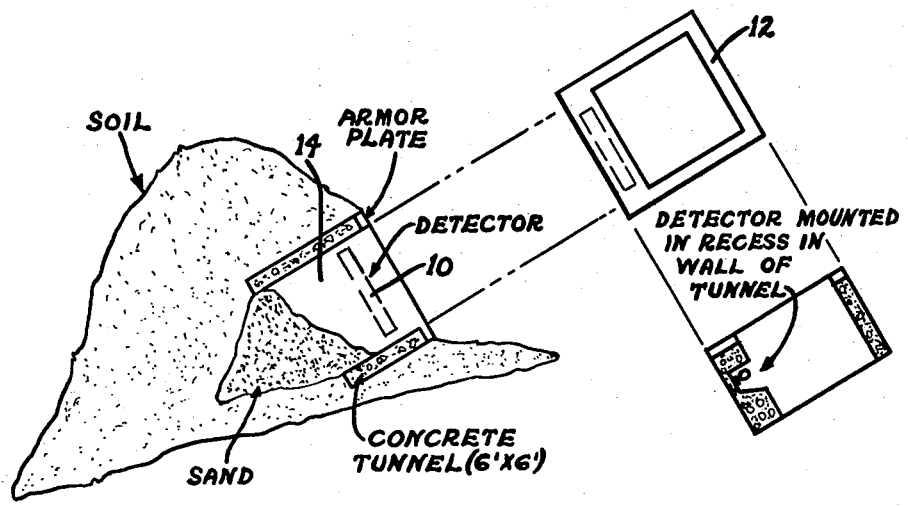
FIG. 2 is a cutaway view of the location of the Schlieren effect detector.

Referring now to FIG. 1, a detector 10 is mounted at the side of frame 12, this frame being about one or two feet inside a tunnel 14. This tunnel is the target visible to the trainee. A projectile entering the tunnel causes a shock wave to pass through a collimated light beam 16. Density gradients caused by this shock wave refract the beam causing a shadow to appear at a photocell 18, located within the optical detecting system. The shadow is detected by the photocell, amplified by amplifier 20 and then applied via coaxial cable 22 to a remote amplifier 24. The pulse is again amplified by amplifier 24 and passes through a gate circuit 26. The pulse output from the gate circuit is counted by the counter 28 as a hit. The pulse also triggers a multivibrator circuit 30 which turns the gate 26 off for a finite length of time so that reflected shock waves, transient waves, and any sand particles thrown up by the impact of the shell will not cause additional counting of this shell. The gate is then turned on again for the next projectile. The counter 28 in a preferred form utilizes a decade gas glow tube counter for the first digit followed by additional gas tube counters. When the counter 28 is in the form of a conventional visible digital counter it functions as a remote hit indicating display panel.

Figure 3:
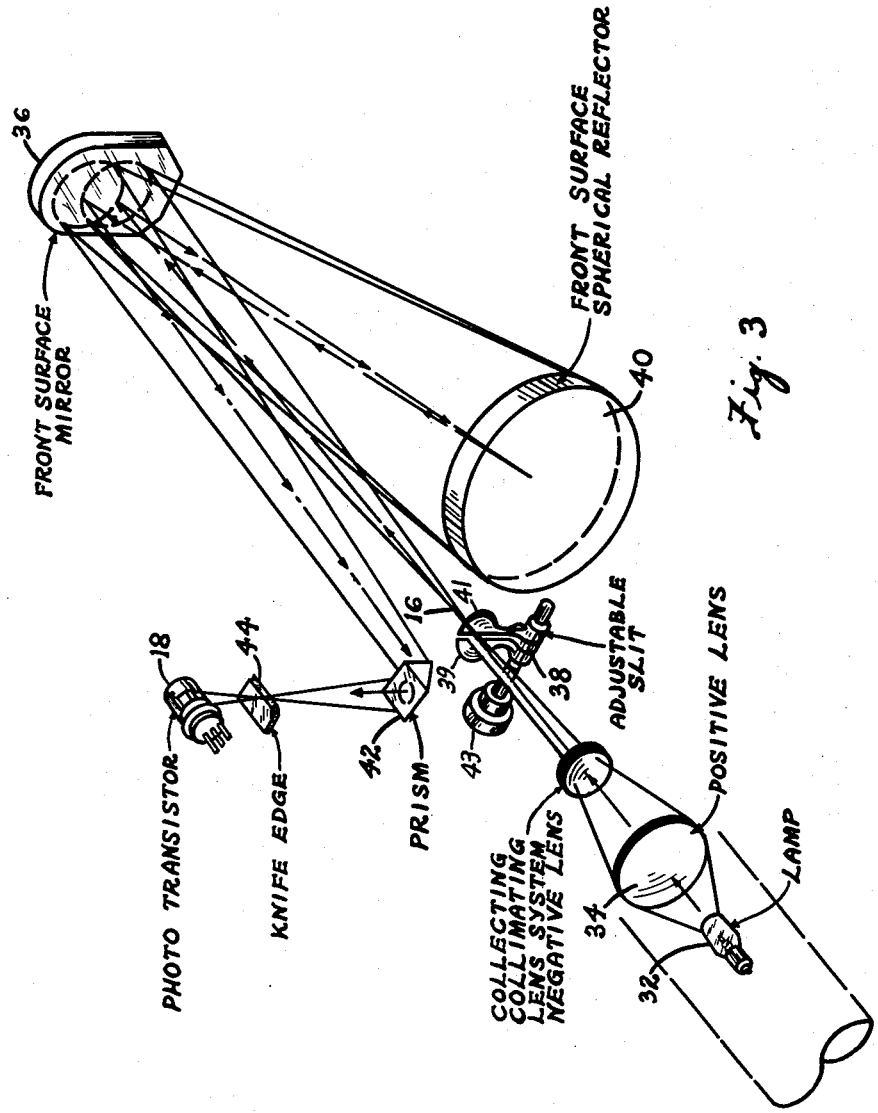
FIG. 3 is a block optical diagram view of a preferred embodiment of the Schlieren effect detector.

Projectiles that miss the mouth of the tunnel would generate shock waves also; however, these waves would be quickly damped and would not extend more than a couple of feet beyond the point of impact. The detector has been placed a distance from the tunnel mouth 14 to be beyond the effect of any succeeding auxiliary shock waves. A preferred embodiment of the invention is shown in FIG. 3. A lamp 32 has a source of power applied to it and it generates light for the operation of the detector. This light is collected and collimated by means of a positive collecting lens 34 in combination with a negative lens to reduce the collective beam of light into a thin pencil of light with a field angle approximately equal to the field angle of the mirror 36. The collimated beam of light 16 then passes through an adjustable slit 38 which controls the amount of light in the optical system. This slit in the preferred embodiment shown, comprises two light-obscuring semicircular segments 39 and 41. Each of these segments is mounted on screw means 43. One of these segments 39 is fixed with respect to screw 43, and the other segment 41 is threaded onto the screw 43, whereby rotation of the screw adjusts the slit size. The beam 16 is then directed at the front surface mirror 36 where it is reflected to the spherical reflector 40. This reflector then reflects the beam back to the front surface mirror 36 where it is reflected to a prism 42 which is above the adjustable slit 38. This prism then reflects the beam up to an adjustable knife edge 44. The beam is then viewed by the photocell 18 and shockwaves generated by shell impact cause a shadow to occur for the following reason:

If a pencil of rays is cut with a knife edge at the point where they focus until half the image has been obscured, the light that passes the knife edge will come in equal amount from all parts of a mirror provided the mirror is a perfect sphere. When the observer places his eye so that it catches the light that passes the edge, he will see an evenly lighted disk. The particular mirror which was selected for the preferred embodiment has an F number 10 eliminating the need for spherical aberration correction afforded by parabolizing. A spherical mirror was used with a diameter of 4.25 inches and a focal length of 45 inches.

Within an optical set up of this type any changes in the index of refraction of the optical medium will cause the light to bend. The light coming through this uneven medium will be thrown more into the obscured side of the image while shadows will be thrown into the visible side. The observer would then see an exaggerating light and shadow relief of the variations of the index of refraction of the medium. These changes in the index of refraction are caused by shock waves due to projectile hits.

By using a front surface concave mirror with a focal length of 45 inches, it is necessary to place both the slit of light and the knife edge at the radius of curvature which is, of course, 90 inches. This would require an extremely large and rigid frame so the system for the preferred embodiment is bent in half by the use of a front surface optical flat placed at half the radius of curvature, which in this case is the mirror 36.

This system has shown excellent sensitivity to rapid shock waves such as those created by projectiles and provides an accurate hit detection system, using the Schlieren effect, an optical device, rather than the heretofore utilized audio methods.

Thus, an automatic hit detector system and a remote score indicating system with continuous scoring is provided, utilizing the Schlieren effect detection.

Obviously many modifications and variations of the present invention are possible in the light of the above teachings. It is therefore to be understood that within the scope of the appended claims the invention may be practiced otherwise than as specifically described.

What is claimed is:

1. An automatic hit detection system utilizing the Schlieren effect for detection of hits on a target, comprising the combination of:

wall means defining a parallelogram front opening forming the target front area, and extending rearwardly from said front opening thereby forming a tunnel;

detection means, mounted in a recess in the wall means, inside the tunnel, including a source of light mounted in front of a light collimating means whereby a collimated beam of light is produced, slit means operatively mounted in front of said collimated light for controlling the amount of collimated light output, mirror means mounted in the path of said collimated light for reducing the length of the optical path of said light whereby the collimated light is reflected towards a circular reflector and then reflected back towards said mirror means and then re-reflected towards prism means mounted in the path of said collimated beam of light, the beam light output of said prism being partially obscured by a knife edge mounted in the light path and a photocell light detector mounted so as to receive the partially obscured collimated light beam from the knife edge;

first amplifier means operatively connected to said detection means;

remote automatic scoring means, for scoring hits detected by said detection means, including a second amplifier means, said second amplifier means being operatively connected to said first amplifier means and to a gating circuit, said gating circuit being operatively connected to a counter and multi-vibrator means operatively connected between the input and output of said gate means for timing the on and off time of said gate means; and remote indicator display panel means, coupled to said scoring means, for displaying hits scored by said automatic scoring device.

2. The combination of claim 1 wherein said collimated means comprise a positive lens and a negative lens combination, said positive lens diameter being twice as large as the diameter of said negative lens.

3. The combination of claim 2 wherein said slit means comprise two light-obscuring semicircular segments, each of said segments being mounted on screw means, said first semicircular segment being fixedly mounted on said screw means and said second semicircular segment being rotatably mounted on said screw means whereby rotation of said screw means causes said semicircular segments to move closer or further apart thereby causing said slit means to vary in size.

4. The combination of claim 3 wherein said remote hit indicating display panel comprises a visible digital counter.

5. The combination of claim 4 wherein said knife edge is mounted at the focal point of the collimated light beam and has adjusting means for moving said knife edge in a direction perpendicular to said light beam into or out of said light beam.

References Cited in the file of this patent
UNITED STATES PATENTS

| | | |
|---|---|---|
| 1,489,566 | Webster | Apr. 8, 1924 |
| 2,723,589 | Bullock et al. | Nov. 15, 1955 |
| 2,783,047 | Faxen | Feb. 26, 1957 |
| 2,795,778 | Bagby | June 11, 1957 |
| 3,061,727 | Roth et al. | Oct. 30, 1962 |